United States Patent Office 3,326,826
Patented June 20, 1967

3,326,826
DYE RECEPTIVE COMPOSITIONS COMPRISING POLYOLEFINS AND NITROGEN-CONTAINING CONDENSATION POLYMERS
Charles A. Cohen, Westfield, N.J., assignor to Esso Research and Engineering Company, a corporation of Delaware
No Drawing. Filed Sept. 4, 1963, Ser. No. 306,637
10 Claims. (Cl. 260—23)

This invention relates to a composition of matter which contains an alpha olefin polymer, and which is dyeable.

Poly alpha olefin polymers have found increasing interest as textile materials because of their desirable properties of strength and low cost. One of the more difficult problems encountered, however, has been the poor dye acceptance of such fibers because of the inertness of a saturated hydrocarbon polymer. Although a poly alpha olefin material, such as polypropylene, can be dyed, its fastness to typical textile environments has been inadequate.

It has now been found that the addition of certain polyamino condensation products to the polymer prior to spinning, in amounts that produce improvements in dye characteristics, permits satisfactory spinning without extensive loss in fiber tensile properties, while providing a readily dyeable textile filament with unusually improved fastness properties. One to twenty weight percent of condensate may be blended with 99 to 80 weight percent of polymer, although it is preferred to use 3 to 12 weight percent of condensate with 97 to 88% of polymer.

The preparation of textile filaments by melt spinning of poly alpha olefins places rather stringent requirements upon materials that may be blended with these polymers. High spinning temperatures and prolonged heating of polymers at those temperatures require that the blending materials possess satisfactory heat stability, as well as compatibility with the polyolefin.

When poly alpha olefins were blended with the polyamino condensation products of this invention, it was found that fibers produced therefrom had satisfactory physical properties, and in addition, the fibers dyed well and had greatly improved resistance to fading from the effects of light, washing, and dry cleaning.

The hydrocarbon polymers of this invention are alpha olefin homopolymers and copolymers. The alpha olefin homopolymer can be prepared by any known process, such as the so-called "low pressure" process, see for example Belgian Patent 533,362 and Belgain Patent 538,782. Examples of homopolymers within the scope of the invention include polyethylene, polypropylene and poly 1-butene. Polymers or copolymers of branched chain alpha olefins where the branching occurs no closer than the 3rd carbon atom can also be employed, such as poly 4-methyl-1-pentene, poly 4,4-dimethyl-1-pentene and poly 3-methyl-1-butene. In general, the homopolymers are prepared from alpha olefins having from 2 to 12 carbon atoms. The copolymers employed in this invention include copolymers of two different alpha olefins such as ethylene-propylene copolymers; ethylene-1-hexane copolymers; and alpha olefin-aromatic olefin copolymers containing from 1 to 15% by weight of an aromatic olefin, such as for example, copolymers of styrene and 4-methyl-1-pentene. All of the olefins shown above are monolefins. Also, blends of one or more of the previously mentioned polymers can be employed. The polymers and copolymers employed in the invention have viscosity average molecular weights ranging from 100,000 to 1,000,000. The preferred polymers and copolymers of the invention are those prepared by the use of alkyl metal catalysts. Most preferred is polypropylene. Catalysts which are useful in this process are mixtures of reducible heavy transition metal compounds and reducing metal containing substances, or mixtures of partially reduced heavy transition metal compounds and organo-metallic activators. Examples of these catalysts are $TiCl_4 + AlEt_3$ and $TiCl_3 + AlEt_3$. The catalysts used for preparing the preferred polymers employed in the instant process are those catalysts given on page 6, line 20 to page 10, line 21 of copending application Ser. No. 831,210, filed Aug. 3, 1959, now abandoned.

The polyamino condensate which is blended with the poly alpha olefin is a polymeric resin which is produced as the batch reaction product of three compounds. The reaction takes place generally between the limits of 150–350° C. but more particularly between 200–250° C., preferably while maintaining or purging the reaction vessel continuously with an inert gas.

The three compounds which are reacted to produce these condensates are:

(1) Cyclic dibasic acids or esters of the following formula:

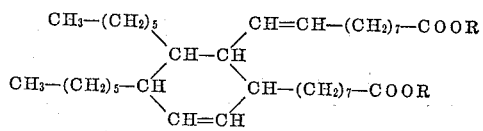

where R may be hydrogen or a lower alkyl radical of from 1 to about 4 carbon atoms. Preferably R is a methyl radical (dimethyl dimerate). Compounds of this type are known in the art as "dimer acids" and are produced commercially by the thermal dimerization, usually in the presence of small amounts of water, of polyene fatty acids or their simple esters. Acids which are suitable for this purpose are for example 9, 11 or 9, 12 octadeca dienoic acids from dehydrated castor oil, linseed, tung, soybean and perilla oils, and trienoic acids such as eleostearic acid and linolenic acids from tung and soybean oils. The "dimer acids" as seen from the discussion above, can be conveniently characterized as dimerized vegetable fatty acids and their simple esters. These "dimer acids" may also be partially or fully hydrogenated.

(2) A diamine of the general formula:

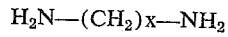

or polyalkylene polyamine of the general formua:

where $x$ is equal to any whole number between 2 and 6 inclusively, $y$ is equal to any whole number between 1 and 4 inclusively, and R is an ethylene ($-CH_2-CH_2-$) or propylene ($-CH_2-CH_2-CH_2-$) radical. Examples of these are ethylene diamine, diethylene triamine, triethylene tetraamine and imino-bis-propylamine. Preferred is triethylenetetraamine and diethylenetriamine.

(3) A saturated linear dibasic acid or ester of the formula:

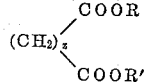

where R and R' may be hydrogen or a lower alkyl radical of from 1 to about 4 carbon atoms and where z equals any whole number between 4 and 10 inclusively. R and R' may be the same or different. Examples of these are adipic acid, pimelic acid, suberic acid, azelaic acid, sebacic acid, dodecane dioic acid or their esters or mixtures of these acids and esters. Preferred is sebacic acid and its esters, especially dimethyl sebacate.

When the above materials are reacted together in a batch-type condensation they produce pale colored, thermoplastic viscous or high melting solid resins with total nitrogen contents of 4 to 16%, and free amine values (expressed as mg. KOH/gm.) which range between 3 and 400. In general, the higher melting solid resins, ranging in the melting point from 190° to 50° C. have amine values from 3 to 90 while the softer, viscous resins have amine values in the range of 200 to 400.

The condensate product is then blended with the poly alpha olefin by well known methods of milling, Banbury mixing, powder blending or solution blending. The blend is then subjected to well known melt spinning techniques to produce readily dyeable mono- and multifilament yarn. The blend may also be wet or dry spun as well. Prior to dyeing, the yarns may be drawn, twisted, plied and knitted or woven into various textile products. In addition, the blended material may instead be extruded in the form of films and foils.

The blend of polymer and condensate can be dyed with aqueous solutions of any of various dyes, preferably acid or metallized dyes. Representative dyes with their alternate names and Color Index number (where said dyes are listed in the Color Index) are shown below:

Acid dyes:
    Kiton Fast Blue G—Acid Blue 43—C.I. 63000
    Hidacid Blue A Conc.—Acid Blue 7—C.I. 42080
    Polar Red 3B—Acid Red 134—C.I. 24810
    Xylene Rubine 3GP—Acid Red 57—No C.I. number
    Lexanol Yellow 6G—Acid Yellow 44—C.I. 23900

Metallized dyes:
    Palatine Fast Blue GGNA Ex.—Acid Blue 158—C.I. 14880
    Vitrolan Red BRE—Acid Red 212—No C.I. number In general the aqueous dye baths employed contain from 0.1 to 10 weight percent dye based on the weight of fiber. The temperature of dyeing and the time of immersion depend on the proportion of polymer and condensate in the blend, the particular polymer and condensate employed, the type and concentration of dye employed, and the intensity of color desired. These parameters can easily be determined by routine experimentation for any particular modified polymer-dye combination. The temperature of dyeing is not critical and can range from 25° to 120° C. although the dye bath is usually maintained at the boiling point.

The invention will be better understood from the following examples:

EXAMPLE 1

Polypropylene fiber was prepared as follows: Pellets of the polymer, prepared by a Ziegler-type catalyst, and having 95.6% n-heptane insoluble material, were charged to a melt spinning device, purged with $N_2$ and evacuated to 25 in. of Hg before starting to spin. Spinning was carried out under the following conditions:

| | |
|---|---:|
| Spinnerette temperature, ° F. | 430 |
| Spinning speed, ft./min. | 250 |
| Draw ratio | 5.15 |
| Draw temperature, ° F. | 200 |
| Inherent viscosity in Decalin at 135° C.: | |
|     Chip | 2.16 |
|     Fiber | 1.65 |
| Fiber denier | 73/18 |
| Tenacity, gms./denier | 4.57 |
| Percent elongation | 29.0 |

EXAMPLE 2

(a) *Dimethyl hydrodimerate.*—A dimeric acid mixture derived from soybean fatty acids was fractionated under high vacuum to separate unpolymerized monobasic acids boiling below 275° C. at 2 torr. Distillation of the residue in a molecular still gave a fraction which showed on analysis to have about 1% of monomeric acid, 95% dimeric acid and the remainder trimeric acid. This fraction was converted to its methyl ester by refluxing with an excess of a solution of 5% anhydrous HCl in methanol for 16 hours, separating the oily layer, washing free of acid and drying by azeotropic distillation. The methyl ester was hydrogenated over Raney nickel catalyst at 200° C. and 1800–3000 p.s.i.g. and finally purified by distillation. It had a boiling point range of 265–278° C. at 1 torr, a saponification number of 194.6 mgm. KOH/gm. and an iodine number of 29.

(b) *Dimethyl sebacate.*—Sebacic acid was esterified with an excess of methanol in the presence of anhydrous HCl. The ester was purified by distillation under high vacuum. It boiled at 121° C. at 1.2 torr and solidified on cooling.

(c) *Polyamide I.*—A flask fitted with a stirrer, thermometer, nitrogen inlet and vapor outlet was charged with 288 grams of the dimethyl hydrodimerate prepared as in (a) above and 146 grams of triethylene tetraamine. While maintaining the reaction mixture at atmospheric pressure, a slow stream of nitrogen was passed through the flask and heat applied. At 120° C., methanol began to distill from the mixture and was collected in a cooled receiver. Distillation of methanol was nearly complete by the time the temperature reached 200° C. at which point the pressure was slowly dropped to 10 torr, during which a quantity of the excess amine was recovered. The reaction mixture was maintained at 200° C. for 15 minutes while purging with nitrogen and then cooled. It had a pale yellow color, was viscous in nature and on analysis showed a total nitrogen content of 13.7% and a free amine value of 360.

(d) *Polyamide II.*—In a manner similar to the preparation of polyamide I, a polyamide was prepared from 230 grams of dimethyl hydrodimerate, 23 grams of dimethyl sebacate and 103 grams of diethylene triamine. On analysis it showed a total nitrogen content of 10.0% and a free amine value of 211.

EXAMPLE 3

A blend of the polypropylene pellets of Example 1 was made with the polyamide I of Example 2 as follows:

Three hundred and eighty grams of polypropylene and 20 grams of the polyamide were charged to a two-roll mill at 320° F. and banded until uniform. The polymer blend was removed as a sheet, broken into pieces about 1 inch square and pressed into a sheet of 350° F. under hydraulic pressure. When cool, the sheet was ground to chip size and charged to a melt spinning apparatus, for spinning into fibers as in Example 1.

Conditions under which the fiber was obtained were:

| | |
|---|---:|
| Spinnerete temperature, ° F. | 430 |
| Spinning speed, ft./min. | 245 |
| Draw ratio | 4.8 |
| Draw temperature, ° F. | 195 |
| Inherent viscosity in Decalin at 135° F.: | |
|     Chip | 1.63 |
|     Fiber | 1.58 |
| Fiber denier | 80/18 |
| Tenacity, gms./denier | 3.84 |
| Percent elongation | 23.4 |

Thus it was shown that satisfactory fibers can be prepared from this blend. The same thing was shown in Example 4, which follows.

EXAMPLE 4

A blend of the polypropylene of Example 1 was made with the polyamide II of Example 2 in the same manner as Example 3 and spun into fibers.

Conditions under which the fiber was obtained were:

| | |
|---|---:|
| Spinnerette temperature, ° F. | 430 |
| Spinning speed, ft./min. | 250 |
| Draw ratio | 4.8 |
| Draw temperature, ° F. | 200 |
| Inherent viscosity in Decalin at 135° F. | |
|     Chip | 1.58 |
|     Fiber | 1.58 |
| Fiber denier | 76/18 |
| Tenacity, gm./denier | 3.98 |
| Percent elongation | 24.2 |

EXAMPLE 5

The fibers prepared in Examples 1, 3 and 4 were knitted in stockinets and dyed in conventional manner with 1% (OWF) of the six acid and two metallized dyes listed above. The dyed samples after rinsing, soaping and drying were examined for fastness to light, washing and dry cleaning stability.

For all dyestucs tested, the unmodified fiber of Example 1 showed only slight staining which was discharged on subsequent washing. The fibers from Examples 3 and 4 showed ring dyeing on microscopical examination with a fair degree of color penetration into the fiber for all the dyes.

Tests for light-fastness

Samples of dyed stockinet from Examples 3 and 4 were exposed to the light from a carbon arc lamp in a Fade-Ometer as described in Standard Test Method 16A-1960 of the A.A.T.C.C. Two of the acid dyes and one metallized dye showed a satisfactory commercial light-fastness in excess of 20 hours.

Tests for wash-fastness

Samples of dyed stockinet from Examples 3 and 4 were tested for wash-fastness by Standard Test Method IIA 61–1957 of the A.A.T.C.C. using the Launder-Ometer. No evidence of bleeding of dyes or transference of color to multifiber test swatches sewn to the test pieces was observed. The test samples showed no change from the original after drying.

Fastness to dry-cleaning

Samples of dyed stockinet from Examples 3 and 4 were tested for fastness to dry cleaning by Test Method 85–1960T of the A.A.T.C.C. using perchloroethylene and the Launder-Ometer. No extraction of color by the solvent from the dyed test pieces was observed, nor was there any change in appearance in the samples when compared to the original.

The advantages of this invention are apparent to those skilled in the art. Polyolefins are blended with materials compatible therewith and fibers are successfully spun from these blends. These fibers are receptive to dyes and the dyed material is fast to the effects of washing, dry cleaning and light.

This invention has been described in connection with certain specific embodiments thereof; however, it should be understood that these are by way of example rather than by way of limitation, and it is not intended that the invention be restricted thereby.

What is claimed is:

1. A dyeable composition of matter comprising
   (a) 99 to 80 weight percent of a polymer of an alpha monolefin, blended with
   (b) 1 to 20 weight percent of a polyamino resin condensate having a nitrogen content of 4–16% and a free amine value of between 3–400, formed as the reaction product at a temperature between about 150°–350° C. of
      (1) a cyclic dibasic material selected from the group consisting of dimerized vegetable fatty acids, their $C_1$–$C_4$ esters, and hydrogenated derivatives of such acids and esters;
      (2) a polyamine selected from the group having the formulas $H_2N$—$(CH_2)_x$—$NH_2$, and $$H_2N—(RNH)_y—RNH_2$$

where $x$ is equal to any whole number between 2 and 6, $y$ is equal to any whole number between 1 and 4, and R is selected from the group consisting of ethylene and propylene radicals; and
      (3) a linear dibasic material of the formula:

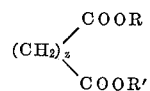

where R and R' are selected from the group consisting of hydrogen and $C_1$–$C_4$ alkyl radicals, and $z$ is equal to any whole number between 4 and 10.

2. The composition of claim 1 wherein 3 to 12 weight percent of the resin is present in the composition.
3. The composition of claim 2 wherein the alpha olefin polymer is polypropylene.
4. The composition of claim 3 wherein the cyclic dibasic material is the hydrogenated derivative of the methyl ester of the dimerized vegetable fatty acid.
5. The composition of claim 4 wherein the linear dibasic material is dimethyl sebacate.
6. The composition of claim 5 wherein the polyamine is triethylene tetraamine.
7. The composition of claim 5 wherein the polyamine is diethylene triamine.
8. A process for dyeing poly alpha monolefin fibers which comprises:
   (a) blending said polymer with 1–20 weight percent of a condensate having a nitrogen content of 4–16% and a free amine value of between 300–400, formed as the reaction product at a temperature between about 150°–350° C. of:
      (1) a cyclic dibasic material selected from the group consisting of dimerized vegetable fatty acids, their $C_1$–$C_4$ esters, and hydrogenated derivatives of such acids and esters;
      (2) a polyamine selected from the group having the formulas $H_2N$—$(CH_2)_x$—$NH_2$, and $H_2N$—$(RNH)_y$—$RNH_2$, where $x$ is equal to any whole number between 2 and 6, $y$ is equal to any whole number between 1 and 4, and R is selected from the group consisting of ethylene and propylene radicals; and
      (3) a linear dibasic material of the formula:

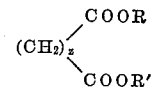

where R and R' are selected from the group consisting of hydrogen and $C_1$–$C_4$ alkyl radicals, and $z$ is equal to any whole number between 4 and 10;
   (b) forming said blend into fibers, and
   (c) contacting said fibers with a dye selected from the group consisting of acid dyes and metallized dyes.
9. A fiber produced from the composition of claim 1.
10. The dyed fiber of claim 8.

References Cited

UNITED STATES PATENTS

| | | | |
|---|---|---|---|
| 3,037,871 | 6/1962 | Floyd et al. | 260—404.5 |
| 3,050,529 | 8/1962 | Dearborn et al. | 260—23 X |
| 3,068,254 | 12/1962 | Le Bras et al. | 260—18 |
| 3,112,159 | 11/1963 | Cappuccio et al. | 8—55 |
| 3,141,787 | 7/1964 | Goetze et al. | 260—404.5 |
| 3,184,281 | 5/1965 | Tsunoda et al. | 8—55 |
| 3,195,975 | 7/1965 | Cappuccio | 8—55 |
| 3,199,940 | 8/1965 | Toureille | 8—55 |

DONALD E. CZAJA, *Primary Examiner.*

LEON J. BERCOVITZ, R. A. WHITE,
*Assistant Examiners.*